United States Patent
Schober et al.

(10) Patent No.: US 11,882,455 B2
(45) Date of Patent: Jan. 23, 2024

(54) UWB COMMUNICATION NODE AND SYSTEM FOR FACILITATING A SECURE LOCALIZATION OF UWB COMMUNICATION NODES

(71) Applicant: NXP B.V., Eindhoven (NL)

(72) Inventors: Michael Schober, Graz (AT); Ulrich Andreas Muehlmann, Graz (AT); Hugues Jean Marie de Perthuis, Garcelles (FR)

(73) Assignee: NXP B.V., Eindhoven (NL)

( * ) Notice: Subject to any disclaimer, the term of this patent is extended or adjusted under 35 U.S.C. 154(b) by 273 days.

(21) Appl. No.: 17/147,801

(22) Filed: Jan. 13, 2021

(65) Prior Publication Data
US 2021/0258795 A1    Aug. 19, 2021

(30) Foreign Application Priority Data
Feb. 14, 2020   (EP) ..................................... 20157347

(51) Int. Cl.
| | | |
|---|---|---|
| *H04W 12/61* | (2021.01) | |
| *H04W 4/80* | (2018.01) | |
| *H04W 12/63* | (2021.01) | |
| *H04W 64/00* | (2009.01) | |
| *H04W 84/18* | (2009.01) | |

(52) U.S. Cl.
CPC ............. *H04W 12/61* (2021.01); *H04W 4/80* (2018.02); *H04W 12/63* (2021.01); *H04W 64/003* (2013.01); *H04W 84/18* (2013.01)

(58) Field of Classification Search
CPC ....... H04W 12/61; H04W 4/80; H04W 12/63; H04W 64/003; H04W 84/18; H04W 4/02; H04W 4/06; H04W 64/00; G01S 13/765; H04B 1/7183; H04B 1/7163
See application file for complete search history.

(56) References Cited

U.S. PATENT DOCUMENTS

| | | | |
|---|---|---|---|
| 10,495,737 B1* | 12/2019 | Torborg | ................. G01S 13/74 |
| 11,448,751 B2* | 9/2022 | Li | .......................... H04W 48/16 |
| 11,536,798 B2* | 12/2022 | Li | .......................... H04W 74/02 |
| 2011/0255453 A1* | 10/2011 | Roh | ..................... H04B 1/7176 370/310 |
| 2017/0131383 A1* | 5/2017 | Bartov | ................. G01S 13/765 |

(Continued)

FOREIGN PATENT DOCUMENTS

WO    2017/196583 A3    11/2017

OTHER PUBLICATIONS

Zubizareeta et al., "Receiver Independent Implementation of the Galileo Open Service Navigation Message Authentication," HAL Archives ID: hal-01942274, Dec. 5, 2018, 7 pages.

(Continued)

*Primary Examiner* — Harunur Rashid

(57) ABSTRACT

In accordance with the first aspect of the present disclosure, an ultra-wideband communication node is provided, comprising: an ultra-wideband communication unit configured to transmit one or more ultra-wideband frames to an external device; a processing unit configured to determine scrambled timestamp sequences for said ultra-wideband frames; wherein the processing unit is further configured to determine designated time slots, within which said scrambled timestamp sequences are to be received by said external device.

17 Claims, 6 Drawing Sheets

(56) References Cited

U.S. PATENT DOCUMENTS

2021/0159938 A1\* 5/2021 Subraveti .............. H04W 56/00
2023/0014199 A1\* 1/2023 Yoon ..................... H04W 12/03

OTHER PUBLICATIONS

Xu et al., "Position Estimation Using UWB TDOA Measurements," Nanyang Techological University, 2006, 6 pages.
Leu et al., "Message Time of Arrival Codes: A Fundamental Primitive for Secure Distance Measurement", International Association for Cryptological Research (IACR), Nov. 22, 2019, pp. 1-17, vol. 20191127:080901, retrieved from the internet at http://eprint.iacr.org/2019/1350.pdf on Nov. 22, 2019.

\* cited by examiner under the United States Patent and Trademark Office's rules.

UWB COMMUNICATION NODE AND SYSTEM FOR FACILITATING A SECURE LOCALIZATION OF UWB COMMUNICATION NODES

TECHNICAL FIELD

The present disclosure relates to an ultra-wideband communication node. Furthermore, the present disclosure relates to a corresponding method of operating an ultra-wideband communication node. Furthermore, the present disclosure relates to a system for facilitating a secure localization of one or more ultra-wideband communication nodes. Furthermore, the present disclosure relates to a corresponding method of operating a system for facilitating a secure localization of one or more ultra-wideband communication nodes.

BACKGROUND

Ultra-wideband (UWB) technology can be used for localizing objects. For this purpose, a localization system may comprise a plurality of ultra-wideband communication anchors configured to transmit messages to ultra-wideband communication nodes and to receive messages from said ultra-wideband communication nodes.

SUMMARY

In accordance with the first aspect of the present disclosure, an ultra-wideband communication node is provided, comprising: an ultra-wideband communication unit configured to transmit one or more ultra-wideband frames to an external device; a processing unit configured to determine scrambled timestamp sequences for said ultra-wideband frames; wherein the processing unit is further configured to determine designated time slots, within which said scrambled timestamp sequences are to be received by said external device.

In one or more embodiments, the ultra-wideband communication unit is configured to transmit data indicative of said designated time slots to the external device.

In one or more embodiments, the communication node comprises a further communication unit, wherein said further communication unit is configured to transmit data indicative of said designated time slots to the external device.

In one or more embodiments, the further communication unit is a Bluetooth communication unit, a Wi-Fi communication unit or a cellular communication unit.

In one or more embodiments, the processing unit is configured to determine said scrambled timestamp sequences and designated time slots using a list or a table received from the external device.

In one or more embodiments, the processing unit is configured to determine said scrambled timestamp sequences and designated time slots by executing a predefined generation function, wherein said generation function has been agreed upon with the external device.

In one or more embodiments, the processing unit is further configured to sign data indicative of the designated time slots.

In one or more embodiments, the external device is comprised in a localization system.

In accordance with a second aspect of the present disclosure, a method of operating an ultra-wideband communication node is conceived, the method comprising: transmitting, by an ultra-wideband communication unit comprised in the communication node, one or more ultra-wideband frames to an external device; determining, by a processing unit comprised in the communication node, scrambled timestamp sequences for said ultra-wideband frames; determining, by said processing unit, designated time slots, within which said scrambled timestamp sequences are to be received by said external device.

In accordance with a third aspect of the present disclosure, a computer program is provided, comprising executable instructions which, when executed by a processing unit, cause said processing unit to perform the steps of a method of the kind set forth.

In accordance with a fourth aspect of the present disclosure, a system is provided for facilitating a secure localization of one or more ultra-wideband communication nodes, the system comprising: an ultra-wideband communication unit configured to receive one or more ultra-wideband frames from said ultra-wideband communication nodes; a verification unit configured to verify whether scrambled timestamp sequences which are associated with said ultra-wideband frames have been received within designated time slots for receiving said scrambled timestamp sequences.

In one or more embodiments, the ultra-wideband communication unit is configured to receive data indicative of said designated time slots.

In one or more embodiments, the system comprises a further communication unit, wherein said further communication unit is configured to receive data indicative of said designated time slots.

In accordance with a fifth aspect of the present disclosure, a method of operating a system for facilitating a secure localization one or more ultra-wideband communication nodes is conceived, the method comprising: receiving, by an ultra-wideband communication unit comprised in said system, one or more ultra-wideband frames from the ultra-wideband communication nodes; verifying, by a verification unit comprised in said system, whether scrambled timestamp sequences which are associated with said ultra-wideband frames have been received within designated time slots for receiving said scrambled timestamp sequences.

In accordance with a sixth aspect of the present disclosure, a computer program is provided, comprising executable instructions which, when executed by a verification unit, cause said verification unit to perform the steps of a method of the kind set forth.

DESCRIPTION OF DRAWINGS

Embodiments will be described in more detail with reference to the appended drawings, in which.

DESCRIPTION OF EMBODIMENTS

Ultra-wideband (UWB) technology can be used for localizing objects. For this purpose, a localization system may comprise a plurality of ultra-wideband communication anchors configured to transmit messages to ultra-wideband communication nodes and to receive messages from said ultra-wideband communication nodes.

Figure 1:
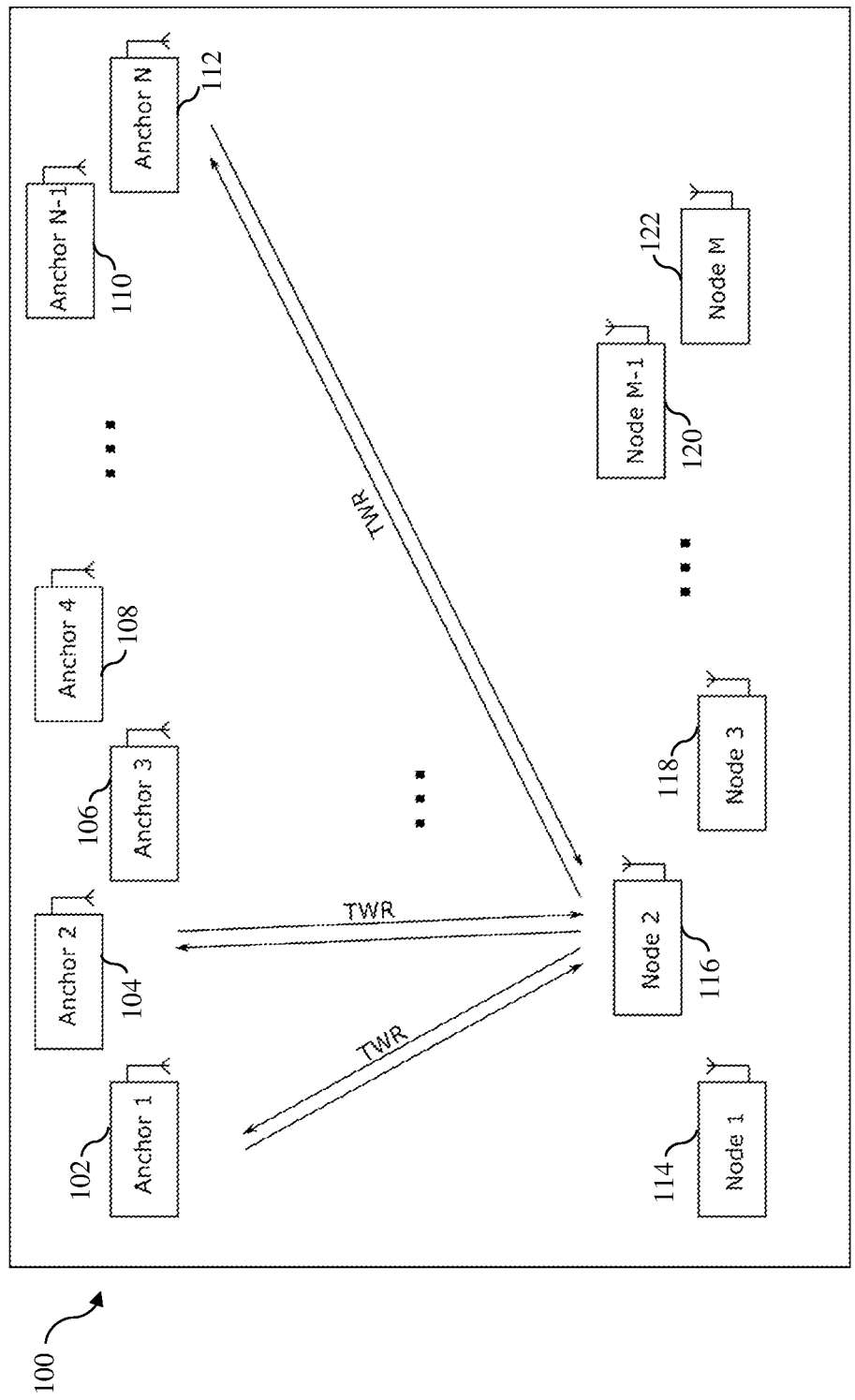
FIG. 1 shows an example of a localization system.

FIG. 1 shows an example of a localization system 100. The localization system 100 comprises a plurality of ultra-wideband communication anchors 102, 104, 106, 108, 110, 112 and a plurality of ultra-wideband communication nodes 114, 116, 118, 120, 122. The localization system 100 may for example be an indoor localization system. An indoor localization system, or indoor positioning system, typically includes a network of devices, which may be used to locate people or objects in environments satellite technologies cannot perform accurate localization operations, such as inside buildings, airports, alleys, parking garages, and underground locations. Most of the currently used indoor localization systems are either based on a bidirectional Two-Way Ranging (TWR) exchange or broadcasts if a synchronized anchor system is used. Using a bidirectional message exchange may provide a higher security regarding replay or relay attacks. When secure bidirectional ranging is applied, both sides append a so-called scrambled timestamp sequence (STS) in their UWB frames for authenticating the frame. The STS changes every time on both sides when a message is transmitted. More specifically, a UWB communication node (e.g. a user's mobile device) and a UWB communication anchor (e.g., forming part of a localization system with a fixed infrastructure), know what the STS of a current message frame should be. Since UWB is used for time-of-flight measurements, a replaying or relaying of the frames would only lead to a longer measured time of flight (TOF), which does not result in a security risk because a secured action is only triggered if a distance is shortened. Also, for a bidirectional TOF measurement no anchor synchronization in the sub-nanosecond domain is needed. In a broadcast-based localization system, no bidirectional message exchange is needed, which reduces the number of UWB frames that should be transmitted. However, in such a broadcast-based localization system, the anchors within the localization system need to be synchronized and an authentication based on a bidirectional message exchange cannot be applied. FIG. 1 shows an example of a multi-anchor, multi-node system that is performing two-way ranging for localizing the nodes. Assuming that the number of anchors within the system is N and that the number of nodes within the system is M, and that every node needs to range with every anchor, then the required number of ranging operations is:

$$\#Rangings = N*M \quad \text{(Equation 1)}$$

Depending on the required ranging update rate and the available channel capacity for the ranging, not every node can be localized as frequently as required. In most systems the number of anchors correlates with the number of nodes in a linear way. This assumption leads to equation 2, where k is a constant that represents the anchors-to-nodes ratio.

$$\#Rangings = k*M^2 \quad \text{(Equation 2)}$$

Both equations are based on the assumption that every node needs to perform a ranging operation with every anchor. Depending on the ranging update rate and the node movement, by using a smart anchor selection algorithm for the ranging the correlation between the number of anchors and the number of ranging operations can be reduced. However, since the channel capacity remains limited, a broadcast-based localization system is more attractive than a TWR-based localization system.

Figure 2:
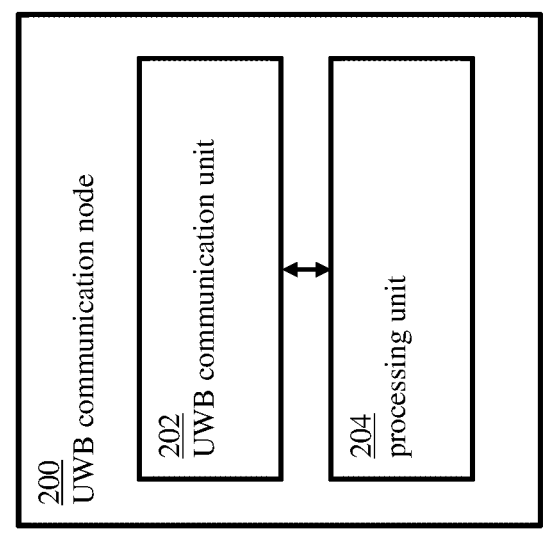
FIG. 2 shows an illustrative embodiment of a UWB communication node.

FIG. 2 shows an illustrative embodiment of a UWB communication node 200. The UWB communication node 200 comprises a UWB communication unit 202 and a processing unit 204. The UWB communication unit 202 is configured to transmit one or more ultra-wideband frames to an external device. Furthermore, the processing unit 204 is configured to determine scrambled timestamp sequences for said ultra-wideband frames, and to determine designated time slots within which said scrambled timestamp sequences are to be received by said external device. In this way, the level of security of broadcast-based localization systems may be increased. More specifically, the designated time slots can be provided to the localization system, such that the localization system may verify if the scrambled timestamp sequences have been received within said designated time slots. If a scrambled timestamp sequence has not been received within its designated time slot, the corresponding UWB frame may for example be rejected. It is noted that the scrambled timestamp sequence will typically be included in or appended to a UWB frame. In this sense, the scrambled timestamp sequence is said to be associated with the UWB frame. Furthermore, it is noted that an ultra-wideband frame may be defined as a single ultra-wideband package that can have different configurations, for example as defined in the IEEE Standard for Low-Rate Wireless Networks (IEEE 802.15.4-2015 or IEEE 802.15.4z). Furthermore, according to the standard IEEE 802.15.4z, a UWB frame may include a ciphered sequence, denoted as the scrambled timestamp sequence, to increase the integrity and accuracy of ranging measurements. Such a ciphered sequence is an example of a scrambled timestamp sequence of the kind set forth.

Figure 3:
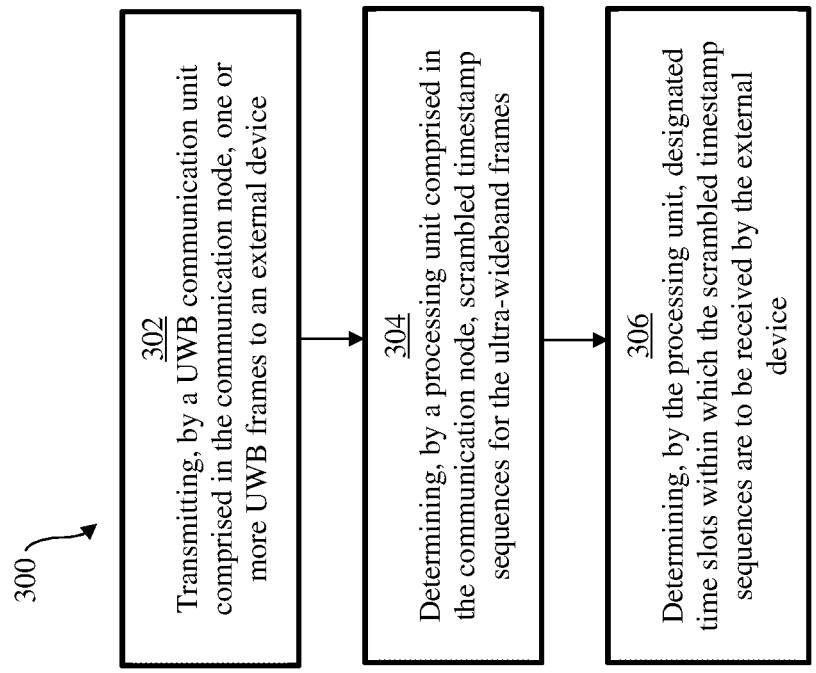
FIG. 3 shows an illustrative embodiment of a method of operating a UWB communication node.

FIG. 3 shows an illustrative embodiment of a method 300 of operating a UWB communication node. The method 300 comprises the following steps. At 302, a UWB communication unit comprised in the UWB communication node transmits one or more UWB frames to an external device. Furthermore, at 304, a processing unit comprised in the UWB communication node determines scrambled timestamp sequences for the ultra-wideband frames. Furthermore, at 306, the processing unit determines designated time slots within which the scrambled timestamp sequences are to be received by the external device. The method 300 may at least partially be implemented as a computer program. As mentioned above, in this way, the level of security of broadcast-based localization systems may be increased.

In one or more embodiments, the ultra-wideband communication unit is configured to transmit data indicative of said designated time slots to the external device. This in-band synchronization may result in a practical implementation, in which the relevant data are transmitted through the UWB channel. Furthermore, this in-band synchronization may result in a reduction of the size of the designated time slots, which in turn further increases the level of security. Furthermore, in one or more embodiments, the UWB communication node comprises a further communication unit, which is configured to transmit data indicative of said designated time slots to the external device. This out-of-band synchronization may result in a practical implementation, in which the burden on the UWB channel is reduced. In a further practical implementation, the further communication unit is a Bluetooth communication unit, a Wi-Fi communication unit or a cellular communication unit.

In one or more embodiments, the processing unit is configured to determine the scrambled timestamp sequences and designated time slots using a list or a table received from the external device. In this way, the scrambled timestamp sequences and their designated time slots can easily be determined. In particular, this list or table may easily be shared between the UWB communication node and the external device (e.g., a device comprised in a localization system). This list or table may contain entries that define specific combinations of scrambled timestamp sequences and designated time slots. Furthermore, in one or more embodiments, the processing unit is configured to determine the scrambled timestamp sequences and designated time slots by executing a predefined generation function, wherein said generation function has been agreed upon with the external device. In this way, the scrambled timestamp sequences and designated time slots can be shared and generated efficiently. In addition, in one or more embodiments, the processing unit is further configured to sign the data indicative of the designated time slots. In this way, the level of security may be further increased.

Figure 4:
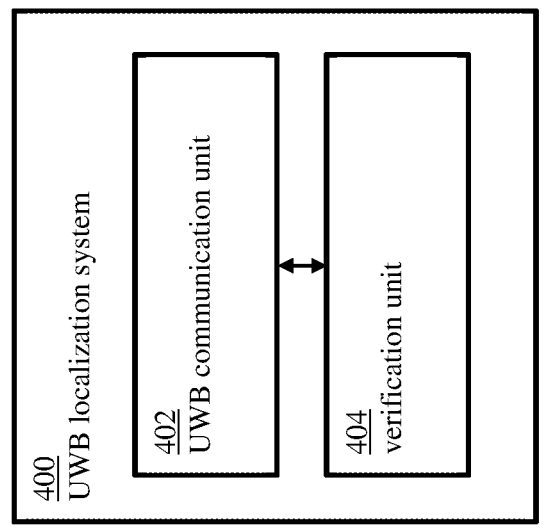
FIG. 4 shows an illustrative embodiment of a system for facilitating a secure localization of one or more UWB communication nodes.

FIG. 4 shows an illustrative embodiment of a system 400 for facilitating a secure localization of one or more UWB communication nodes. The system 400 comprises an ultra-wideband communication unit 402 and a verification unit 404. The ultra-wideband communication unit 402 is configured to receive one or more ultra-wideband frames from the ultra-wideband communication nodes. Furthermore, the verification unit 404 is configured to verify whether scrambled timestamp sequences which are associated with said ultra-wideband frames have been received within designated time slots for transmitting said scrambled timestamp sequences. In this way, the level of security of broadcast-based localization systems may be increased. More specifically, the designated time slots can be received or configured out-of-band or in-band, such that the localization system may verify if the scrambled timestamp sequences have been received within said designated time slots. If a scrambled timestamp sequence has not been received within its designated time slot, the corresponding UWB frame may for example be rejected.

It is noted that a scrambled timestamp sequence (STS) typically comprises a sequence of pulses. A receiving unit can verify if a known sequence has been received within a given time slot if the transmitting and receiving unit are synchronized. That is to say, if the transmitting and receiving unit are synchronized, the reception time of the STS by the external device correlates with the transmission time of the STS by the UWB node. Thus, in that case, the processing unit may determine the designated time slots based on the transmission time of the associated STS, for example taking into account a predetermined duration between the transmission of the STS by the UWB node and the reception of said STS by the external device (i.e., the receiving unit). As a result of a UWB frame reception the receiving unit will get a STS verification result (pass or fail or likelihood of pass) and a reception timestamp of the received STS. Since the receiver does not have a perfect internal clock and does not know the UWB frame propagation delay, it may only be possible to estimate if the frame has been received within a time slot. For this purpose, a predefined tolerance may be taken into account. Accordingly, the verification unit 404 may be configured to verify if a UWB frame received within a time slot can be considered for the localization of the transmitting node. Based on the UWB frame reception time, the verification result of the STS sequence within the frame and the agreed time slot for the frame transmission, the verification unit 404 may decide to use or not to use the received frame for the localization.

Figure 5:
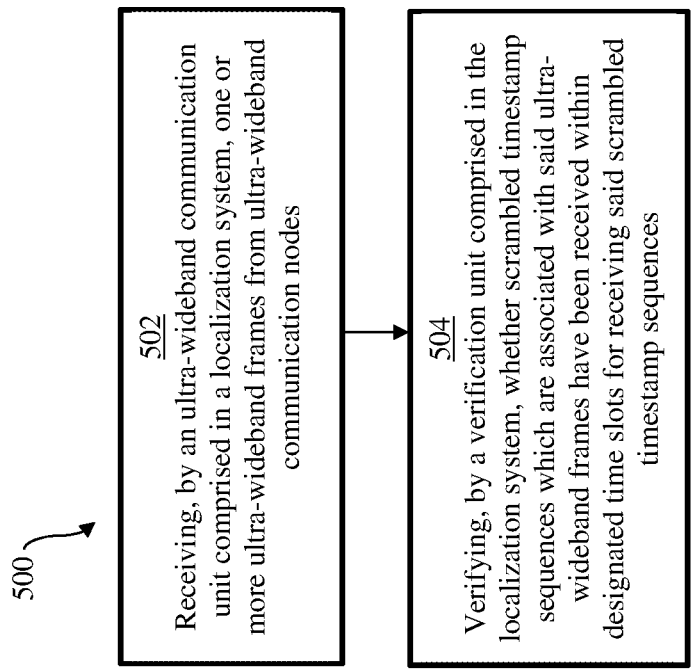
FIG. 5 shows an illustrative embodiment of a method of operating a system for facilitating a secure localization of one or more UWB communication nodes.

FIG. 5 shows an illustrative embodiment of a method 500 of operating a system for facilitating a secure localization of one or more UWB communication nodes. The method 500 comprises the following steps. At 502, an ultra-wideband communication unit comprised in a localization system receives one or more ultra-wideband frames from ultra-wideband communication nodes. Furthermore, at 504, a verification unit comprised in the localization system verifies whether scrambled timestamp sequences which are associated with said ultra-wideband frames have been received within designated time slots for transmitting said scrambled timestamp sequences. The method 500 may at least partially be implemented as a computer program. As mentioned above, in this way, the level of security of broadcast-based localization systems may be increased.

In one or more embodiments, the ultra-wideband communication unit is configured to receive data indicative of the designated time slots. This in-band synchronization may result in a practical implementation, in which the relevant data are transmitted through the UWB channel. Furthermore, this in-band synchronization may result in a reduction of the size of the designated time slots, which in turn further increases the level of security. Furthermore, in one or more embodiments, the system comprises a further communication unit, which is configured to receive data indicative of the designated time slots.

Figure 6:
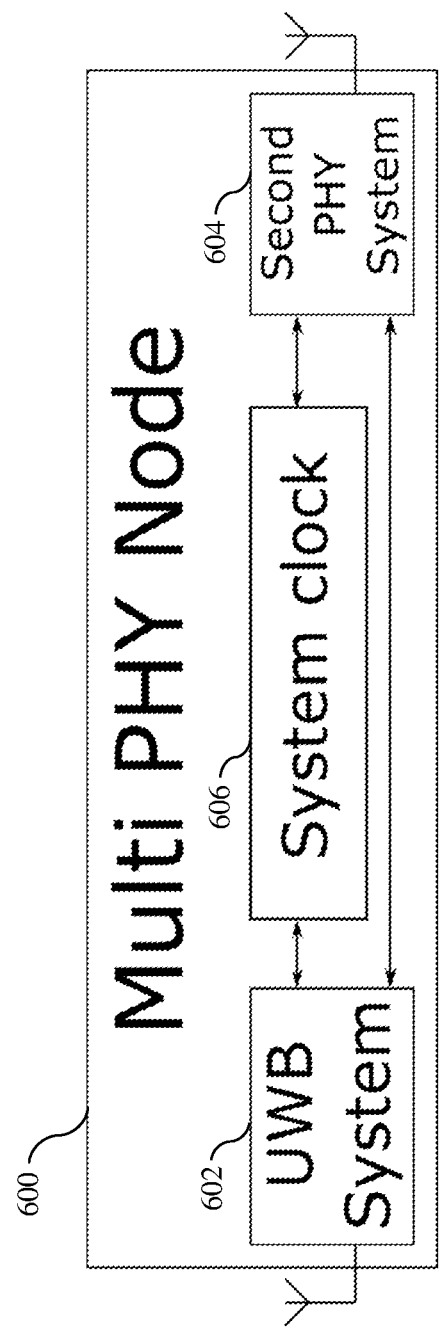
FIG. 6 shows an illustrative embodiment of a multiple communication channel node.

FIG. 6 shows an illustrative embodiment of a multiple communication channel node 600. The multiple communication channel node 600 comprises a UWB system 602—i.e. a first communication channel subsystem including a UWB transceiver—and a second communication channel system, which for example includes a Bluetooth communication device, a Wi-Fi communication device or a cellular communication device (e.g. 5G). A common system clock 606 is configured to provide a clock signal to both the UWB system 602 and the second communication channel system 604. It is noted that the term "PHY" represents a physical layer, which is typically implemented as an electronic circuit, more specifically as a chip, which supports physical layer functions of a communication channel. In accordance with the present disclosure, the second communication channel system 604 may be used for out-of-band synchronization, in the sense that data indicative of designated time slots for scrambled timestamp sequences are communicated through said second communication channel system 604.

In particular, for securing broadcasted frames that contain a scrambled timestamp sequence (STS), a second communication channel or an accurate internal clock can be used for deriving the STS key that is used for the next broadcasts. By changing the STS for every broadcast and having a tight time window for every broadcast, the security level may be increased significantly. Especially if a second communication channel is used, the STS keys for the broadcasts can be exchanged through the second communication channel, which makes it more difficult for an attacker to forge the broadcasts. It is noted that an STS key is a key that can be used for generating an STS. Thus, an STS key can be used for deriving an STS, which is then communicated. How the key is used depends on the implementation. For example, the generation of the STS may be based on a seed value, or the STS key may be combined with a counter. In addition to the STS keys, the second communication channel may be used to transmit information such as the exact position of the different anchors. The information may be protected using an asymmetric signature, such that nodes can verify the integrity and authenticity of the information with a public key.

Thus, a second communication channel system with a higher channel capacity (e.g., 5G) may be used for securing the UWB interface, which in turn enables using a broadcast-based localization system in a secure manner. The second communication channel system may also be used for exchanging the STS (or a limited set of data allowing generation of STS) of the broadcasts. Thus, the STS itself can be exchanged, or a limited set of data that enables the generation of the STS. The limited set of data may include an STS key, for example. FIG. 6 shows an example of a node that is based on an UWB system 602 and an additional, second PHY system 604. Between the UWB system 602 and the second PHY system 604 a bidirectional data exchange is possible. For example, when the second, secure PHY system 604 receives an update of the STS with a timestamp for the STS slot, the second PHY system 604 can report the STS and its slot to the UWB system 602. Only if the UWB system uses the correct STS within its designated time slot for its broadcast, the localization system will trust the broadcast. The shorter the time slots for an STS is, the more difficult it is for an attacker to reuse the received message. Depending on the amount of data that can be exchanged over the second PHY system 604, the STS can also be generated as a function of the time. For example, in FIG. 6 the second PHY system 604 has also access to a common system clock 606 that can be used for deriving the STS.

By trimming the common system clock 606 according to the time synchronization messages that may be received by the second PHY system 604, very short time gaps can be used for the transmission of an STS Trimming of the clock may also be carried out regularly by a third system (not shown), such as GPS, which delivers a very accurate pulse per second (PPS) signal. Furthermore, if the connection to the second PHY system 604 is lost temporarily, then if the system clock 606 is trimmed accurately enough a STS for the localization broadcasts can still be generated. It is noted that the amount of time during which the node system can work independently from the second PHY system 604 depends on the drifts of both system clocks, i.e. the system clock of the localization system that is used as a time reference and the node's system clock 606 that is trimmed according to the localization system clock. Furthermore, it is noted that FIG. 6 merely shows an example system architecture that may be used for securing UWB broadcasts. The skilled person will appreciate that the actual system architecture and time synchronization will depend on the interfaces of the used devices and the required synchronization accuracy.

Figure 7:
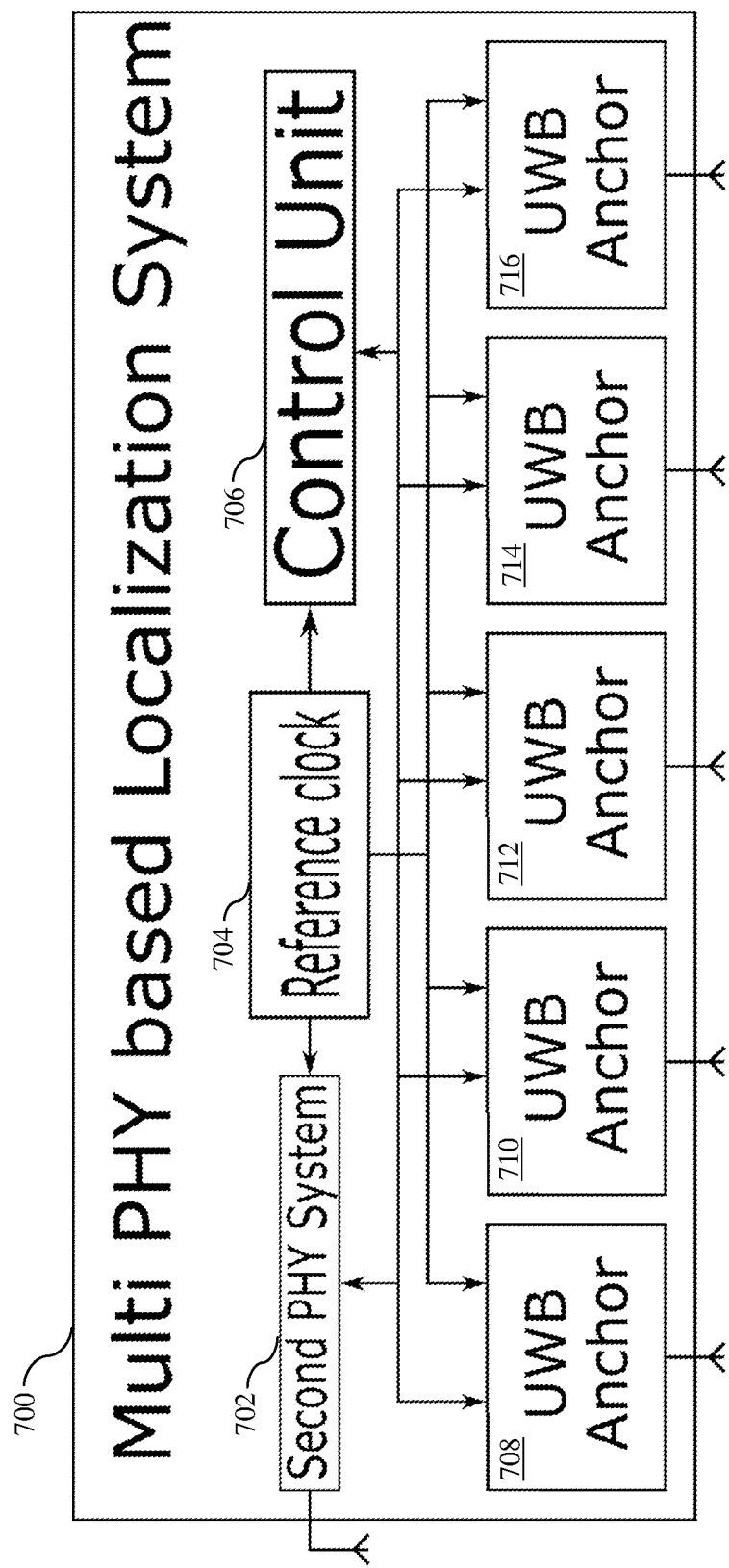
FIG. 7 shows an illustrative embodiment of a multiple communication channel-based localization system.

FIG. 7 shows an illustrative embodiment of a multiple communication channel-based localization system 700. The system 700 comprises a plurality of UWB anchors 708, 710, 712, 714, 716, a control unit 706, a reference clock 704 and a second communication channel system 702. In this embodiment, the control unit 706 is connected to all the anchors 708, 710, 712, 714, 716. The control unit 706 is configured to combine the timestamp data for calculating the position of the nodes that should be localized. The control unit 706 is also configured to control the second communication channel system 702, for example in order to exchange data or communicate an STS key update to the nodes. The reference clock 704 of the system 700 is connected to both the anchors 708, 710, 712, 714, 716 and the second communication channel system 702, which therefore run on a common clock basis. Thus, the second communication channel system 702 is also in sync with the anchors 708, 710, 712, 714, 716 and the synchronization messages transmitted over the second communication channel can also be used for a synchronization of the nodes. Once a secure connection and time synchronization between the localization system and a node has been established, the node can start sending broadcasts that contain a previously agreed STS. The localization system 700 knows which STS to expect in which time slot, and only if the received STS in a broadcast matches with the time slot, the broadcast may be regarded as valid and be used for localizing the node. It is noted that the architecture shown in FIG. 7 is merely an example; depending on the requirements, a different architecture may be envisaged.

Figure 8:
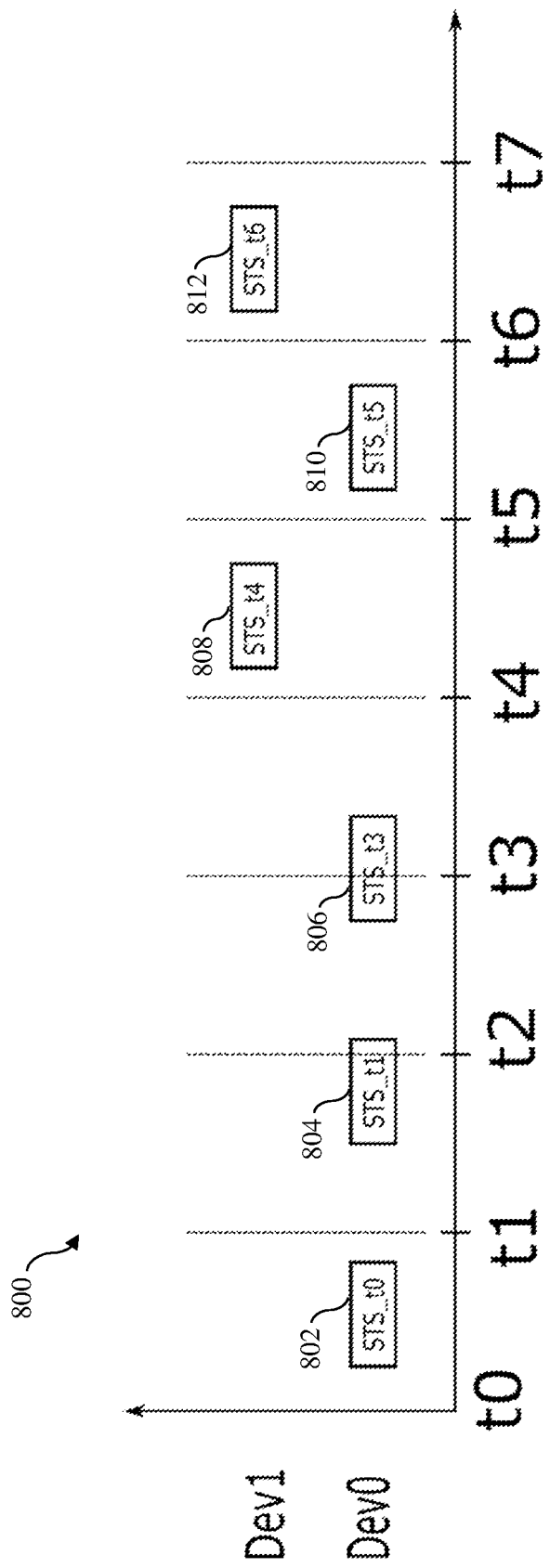
FIG. 8 shows an illustrative embodiment of a timing of scrambled timestamp sequences.

FIG. 8 shows an illustrative embodiment of a timing 800 of scrambled timestamp sequences receptions 802, 804, 806, 808, 810, 812. The scrambled timestamp sequences 802, 804, 806, 808, 810, 812 may be included in UWB frames which are transmitted by a node to a localization system of the kind set forth. In this embodiment, for every time slot the UWB frame that is transmitted should have a different, previously agreed upon STS. The STS agreement may be based on an STS generation function that has time as input or it may be based on a previously shared list or table that specifies combinations of STSs and designated time slots. The former is an example of a predefined generation function of the kind set forth. If the correct STS is received in the corresponding time slot the localization system can use the corresponding UWB frame for localizing the node. If an STS frame overlaps two slots, such as the frame STS_t1 804, then the localization system can detect this and will not use the UWB frame associated therewith for the localization of the node. It is noted that the scheduling of the UWB frames can be performed out-of-band. If an attacker wants to forge the position of a node, he needs to shield the UWB frame transmissions and replay them within the same time slot. By shortening the time slots for the frame transmissions, the time slot for the retransmission of a frame is also shortened, such that the burden on the attacker may be increased significantly. By adding logic to the localization system, which is configured to reject messages when the position change is too big or does not correlate with the movement of sensors within the nodes, or if there is a mismatch between the measured distance from anchors and their respective known positions, an attack is very limited in the positions that can be forged, unless an attacker is able to replace the complete anchor network. Also, if a broadcast has been received twice an attack can be detected. If the two systems (i.e., the node and the localization system) do not have a common second communication channel, a common time reference (e.g., GPS/4G) may be sufficient for generating the time-dependent STS. The origin of the message can be communicated using the PHY service data unit (PSDU) field of the UWB frame. This field is also defined in the IEEE Standard for Low-Rate Wireless Networks (IEEE 802.15.4-2015).

The time synchronization between the localization system and the nodes may also be performed through the UWB channel, by using verified synchronization broadcasts transmitted by the localization system. Only the scheduling may be performed out-of-band, in order to keep the UWB channel utilization as low as possible. The in-band synchronization has the advantage that the synchronization can be performed in the nanosecond domain, which means that the time slot size can be reduced to nearly the UWB frame length, which in turn increases the level of security of the system. Since the localization system may comprise multiple anchors, the broadcasts can be transmitted with a very tight timing behavior, which means that a node can verify the broadcasts also based on the timing behavior of the broadcasts and its position. Depending on the number of nodes and the available channel capacity, also the broadcasts transmitted by the anchors can be used to estimate the positions on the node side by using the anchors as a type of indoor GPS. For such a kind of system the broadcasts may be cross-checked using a second communication channel, in order to increase the difficulty of replaying of the broadcast on the attacker side. However, if one node has been compromised and the broadcast sequence including the STSs are known to an attacker, all nodes may be affected. Thus, it is useful to compare the relative movement of the node, for example based on an inertial measurement unit (IMU) measurement, with the position change which is calculated using the UWB broadcasts. The advantage of a broadcast-based system is that the channel utilization only correlates with the number of used anchors within the system, which means that in theory an infinite number of nodes can be added to the system. Thus, depending on the number of nodes an anchor broadcast-only system may be considered, depending on the number of nodes that should be localized. In addition to the STS, also authenticated message content may be transmitted in the UWB broadcasts, for example by encrypting the message content, including a nonce or timestamp, using asymmetric cryptography. In that way, only the owner of the private key (e.g. the anchor system) can encrypt the messages and the nodes can decrypt them using a corresponding public key.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 localization system
102 anchor 104 anchor
106 anchor
108 anchor
110 anchor
112 anchor
114 node
116 node
118 node
120 node
122 node
200 UWB communication node
202 UWB communication unit
204 processing unit
300 method of operating a UWB communication node
302 transmitting, by a UWB communication unit comprised in the communication node, scrambled timestamp sequences for the ultra-wideband frames
304 determining, by a processing unit comprised in the communication node, scrambled timestamp sequences for the ultra-wideband frames
306 determining, by the processing unit, designated time slots within which the scrambled timestamp sequences are to be received by the external device
400 system for facilitating a secure localization of one or more UWB communication nodes
402 UWB communication unit
404 verification unit
500 method of operating a system for facilitating a secure localization of one or more UWB communication nodes
502 receiving, by an ultra-wideband communication unit comprised in a localization system, one or more ultra-wideband frames from ultra-wideband communication nodes
504 verifying, by a verification unit comprised in the localization system, whether scrambled timestamp sequences which are associated with said ultra-wideband frames have been received within designated time slots for receiving said scrambled timestamp sequences
600 multiple communication channel node
602 UWB system
604 second communication channel system
606 system clock
700 multiple communication channel-based localization system
702 second communication channel system
704 reference clock
706 control unit
708 UWB anchor
710 UWB anchor
712 UWB anchor
714 UWB anchor
716 UWB anchor
800 timing of scrambled timestamp sequences
802 scrambled timestamp sequence
804 scrambled timestamp sequence
806 scrambled timestamp sequence
808 scrambled timestamp sequence
810 scrambled timestamp sequence
812 scrambled timestamp sequence

What is claimed is:

1. An ultra-wideband communication node, comprising:
processing circuitry coupled to ultra-wideband ("UWB") circuitry configured to communicate with an external UWB anchor device over a first communication channel;
wherein the processing circuitry is configured to transmit, using the ultra-wideband circuitry, one or more ultra-wideband frames to the external device via the first communication channel;
wherein the processing circuitry is further configured to:
determine scrambled timestamp sequences for said ultra-wideband frames;
determine designated time slots of said ultra-wideband frames within which said scrambled timestamp sequences are to be received by said external device;
transmit the scrambled timestamp sequences to the external device in the designated time slots of said ultra-wideband frames using the ultra-wideband circuitry; and
transmitting data that identify the designated time slots of said ultra-wideband frames to the external UWB anchor device.

2. The communication node of claim 1, further comprising out-of-band communication circuitry, configured to communicate with the external UWB anchor device over a second communication channel;
wherein the processing circuitry is further configured to transmit the data that identify said designated time slots to the external UWB anchor device over the second communication channel using the out-of-band communication circuitry.

3. The communication node of claim 2, wherein the further out-of-band communication circuitry is Bluetooth communication circuitry, Wi-Fi communication circuitry or cellular communication circuitry.

4. The communication node of claim 1, wherein the processing circuitry is configured to determine said scrambled timestamp sequences and to determine the designated time slots using a list or a table received from the external UWB anchor device.

5. The communication node of claim 1, wherein the processing circuitry is configured to determine said scrambled timestamp sequences and designated time slots by executing a predefined generation function, wherein said generation function has been agreed upon with the external UWB anchor device.

6. The communication node of claim 1, wherein the processing circuitry is further configured to cryptographically sign the data that identify the designated time slots.

7. The communication node of claim 1, wherein the external UWB anchor device is comprised in a localization system.

8. A method of operating an ultra-wideband communication node, comprising:
transmitting, by processing circuitry of the ultra-wideband ("UWB") communication node, over a first communication channel, using ultra-wideband communication circuitry comprised in the communication node, one or more ultra-wideband frames to an external UWB anchor device;
determining, by the processing circuitry of the ultra-wideband communication node, scrambled timestamp sequences for said ultra-wideband frames;
determining, by said processing circuitry, designated time slots of said ultra-wideband frames, within which said scrambled timestamp sequences are to be received by said external UWB anchor device;
transmitting, by said processing circuitry using the ultra-wideband circuitry, the scrambled timestamp sequences to the external UWB anchor device in the designated time slots of said ultra-wideband frames; and transmitting, to the external UWB anchor device, data that identify the designated time slots within the one or more UWB frames.

9. A non-transitory storage medium storing executable instructions which are configured, when executed by processing circuitry, to cause said processing circuitry to perform the steps of the method of claim 8.

10. The method of claim 8, wherein the processing circuitry of the ultra-wideband communication node transmits the data that identify the designated time slots to the external UWB anchor device using out-of-band communication circuitry configured to communicate with the external UWB anchor device over a second communication channel.

11. The method of claim 10, wherein the out-of-band communication circuitry is Bluetooth communication circuitry, Wi-Fi communication circuitry or cellular communication circuitry.

12. The method of claim 8, wherein the processing circuitry determines said scrambled timestamp sequences and designated time slots using a list or a table received from the external UWB anchor device.

13. The method of claim 8, wherein the processing circuitry determines said scrambled timestamp sequences and designated time slots by executing a predefined generation function, wherein said generation function has been agreed upon with the external UWB anchor device.

14. The method of claim 8, wherein the processing circuitry cryptographically signs the data that identify the designated time slots.

15. A system for facilitating a secure localization of one or more ultra-wideband ("UWB") communication nodes, the system comprising:

an ultra-wideband anchor device having processing circuitry coupled to ultra-wideband communication circuitry;

wherein the processing circuitry is configured to receive one or more ultra-wideband frames from a particular ultra-wideband communication node over a first communication channel via the ultra-wideband communication circuitry;

wherein the processing circuitry is further configured to verify whether scrambled timestamp sequences which are associated with said ultra-wideband frames have been received within designated time slots of said ultra-wideband frames for receiving said scrambled timestamp sequences from the particular ultra-wideband communication node; and wherein the processing circuitry is further configured to receive data that identify the designated times slots of said ultra-wideband frames.

16. The system of claim 15, wherein the processing circuitry is further configured to use the ultra-wideband communication circuitry to receive the data that identify said designated time slots.

17. The system of claim 15, further comprising out-of-band communication circuitry coupled to the processing circuitry and configured to communicate with ultra-wideband communication nodes over a second channel;

wherein the processing circuitry is further configured to receive the data that identify said designated time slots over the second communication channel using the out-of-band communication circuitry.

* * * * *